US012560098B2

(12) United States Patent
Kilchyk et al.

(10) Patent No.: US 12,560,098 B2
(45) Date of Patent: Feb. 24, 2026

(54) INTEGRATED AIR CYCLE MACHINE FOR AN ENVIRONMENTAL CONTROL SYSTEM OF AN AIRCRAFT

(71) Applicant: Hamilton Sundstrand Corporation, Charlotte, NC (US)

(72) Inventors: Viktor Kilchyk, Williamsville, NY (US); John Giuliano, North Granby, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 18/806,936

(22) Filed: Aug. 16, 2024

(65) Prior Publication Data

US 2026/0049563 A1 Feb. 19, 2026

(51) Int. Cl.
*F01D 25/14* (2006.01)
*F01D 25/12* (2006.01)

(52) U.S. Cl.
CPC ............. *F01D 25/14* (2013.01); *F01D 25/12* (2013.01); *F05D 2220/323* (2013.01); *F05D 2230/31* (2013.01)

(58) Field of Classification Search
CPC ............ B64D 13/06; B64D 2013/0674; B64D 2013/0614; B64D 2013/0618; B64D 2013/0611; B64D 2013/0644; B64D 13/006; B64D 13/02; B64D 13/04; B64D 13/08; B64D 2013/0648; B64D 41/00; F02C 6/08; F02C 3/04; F16C 2360/23; F01D 3/00; F01D 25/14; F01D 25/12; F05D 2220/323; F05D 2230/31; F04D 17/02
See application file for complete search history.

(56) References Cited

U.S. PATENT DOCUMENTS

| | | | | |
|---|---|---|---|---|
| 4,503,683 | A | 3/1985 | Wieland et al. | |
| 4,967,565 | A * | 11/1990 | Thomson | B64D 13/06 62/57 |
| 5,113,670 | A | 5/1992 | Mcauliffe et al. | |
| 5,414,992 | A * | 5/1995 | Glickstein | F02C 7/224 60/39.83 |
| RE36,101 | E | 2/1999 | Andres et al. | |
| 8,042,354 | B1 * | 10/2011 | Dziorny | B64D 13/06 62/402 |
| 8,418,495 | B2 | 4/2013 | Merritt et al. | |
| 9,797,314 | B2 | 10/2017 | Hillel et al. | |
| 9,976,933 | B2 | 5/2018 | Army et al. | |
| 2024/0183282 | A1 | 6/2024 | Kilchyk et al. | |

FOREIGN PATENT DOCUMENTS

| | | | |
|---|---|---|---|
| CN | 210569334 | U | 5/2020 |
| JP | 4969272 | B2 | 4/2012 |

* cited by examiner

*Primary Examiner* — Eric J Zamora Alvarez
(74) *Attorney, Agent, or Firm* — CANTOR COLBURN LLP

(57) ABSTRACT

An air cycle machine (ACM), having a heat exchanger having a front end and an aft end; a compressor at the front end of the heat exchanger; a turbine at the aft end of the heat exchanger; a shell having a shell front part that surrounds the compressor and defines a shell inlet, a shell aft part that surrounds the turbine and defines a shell outlet, and a shell middle part that surrounds the heat exchanger, wherein a flow passage is defined within the shell and around the compressor, through the heat exchanger, and around the turbine; and a shaft extending between the compressor and the turbine that couples the compressor and the turbine.

14 Claims, 6 Drawing Sheets

INTEGRATED AIR CYCLE MACHINE FOR AN ENVIRONMENTAL CONTROL SYSTEM OF AN AIRCRAFT

BACKGROUND

The embodiments are directed to an environmental control system (ECS) of an aircraft and more specifically to an integrated air cycle machine (ACM) for an ECS of an aircraft.

An ECS for an aircraft may have an ACM, which includes various components including a turbine and compressor that are operationally coupled to each other, a heat exchanger to condition air traveling between the turbine and compressor, and inter-component piping. Another heat exchanger may be included upstream of the compressor, connected to the ACM via additional piping to condition air entering the ACM, i.e., improving the operational efficiency of the compressor. Considerations related to utilizing these components include spatial requirements, a configuration of the piping, and inefficiencies separately introduced into the ECS by each of the components. In addition, the ACM may include both a centrifugal (mixed axial and radial flow) compressor and a mixed flow turbine, neither of which approach the efficiency of an axial stage rotor. Traditional ACM configurations have a complex ducting and valve arrangement between the heat exchanger and rotor stages. This configuration may result in a considerable weight and size penalty.

BRIEF SUMMARY

Disclosed is an air cycle machine (ACM), including a heat exchanger having a front end and an aft end; a compressor at the front end of the heat exchanger; a turbine at the aft end of the heat exchanger; a shell having a shell front part that surrounds the compressor and defines a shell inlet, a shell aft part that surrounds the turbine and defines a shell outlet, and a shell middle part that surrounds the heat exchanger, wherein a flow passage is defined within the shell and around the compressor, through the heat exchanger, and around the turbine; and a shaft extending between the compressor and the turbine that couples the compressor and the turbine.

In addition to one or more of the above disclosed aspects of the ACM or as an alternate: the compressor is an axial compressor; the shell front part has a first front portion that is forward of the compressor and a first aft portion surrounding the compressor; the first front portion of the shell front part diverges toward the first aft portion of the shell front part; and the first aft portion of the shell front part converges toward the shell middle part.

In addition to one or more of the above disclosed aspects of the ACM or as an alternate: the turbine is an axial turbine that includes a turbine high pressure stage and a turbine low pressure stage that is aft of the turbine high pressure stage; the shell aft part has a second front portion surrounding the turbine high pressure stage and a second aft portion surrounding the turbine low pressure stage; the second front portion of the shell aft part diverges toward the second aft portion of the shell aft part; and the second aft portion of the shell aft part converges aft of the second front portion of the shell aft part.

In addition to one or more of the above disclosed aspects of the ACM or as an alternate: the compressor is an axial compressor; and the shell front part converges toward the shell middle part.

In addition to one or more of the above disclosed aspects of the ACM or as an alternate: the turbine is an axial turbine that includes a turbine high pressure stage and a turbine low pressure stage that is aft of the turbine high pressure stage; the shell aft part has a second front portion surrounding the turbine high pressure stage and a second aft portion surrounding the turbine low pressure stage; the second front and aft portions of the shell aft part define first and second diverging cone angles that diverge aft of the shell middle part.

In addition to one or more of the above disclosed aspects of the ACM or as an alternate the first and second diverging cone angles differ from each other.

In addition to one or more of the above disclosed aspects of the ACM or as an alternate, the ACM includes a front heat exchanger extending forward from the shell front part.

In addition to one or more of the above disclosed aspects of the ACM or as an alternate: the turbine includes a turbine high pressure stage and a turbine low pressure stage that is aft of the turbine high pressure stage; the turbine high pressure stage is a mixed flow turbine stage and the turbine low pressure stage is an axial turbine stage; the shell aft part has a second front portion surrounding the turbine high pressure stage and a second aft portion surrounding the turbine low pressure stage; the second front portion of the shell aft part conforms to a shape of the mixed flow turbine stage to encase a turbine radial inlet and a turbine axial outlet of the mixed flow turbine stage; and the second aft portion of the shell aft part diverges aft of the second front portion the shell aft part.

In addition to one or more of the above disclosed aspects of the ACM or as an alternate, the ACM includes a water collector located: between the turbine stages; and/or at the shell inlet.

In addition to one or more of the above disclosed aspects of the ACM or as an alternate: the compressor is a centrifugal compressor; and the shell front part conforms to a shape of the centrifugal compressor so that the shell inlet is a compressor axial inlet and the shell front part encases a compressor radial outlet.

In addition to one or more of the above disclosed aspects of the ACM or as an alternate: the turbine includes a turbine high pressure stage and a turbine low pressure stage that is aft of the turbine high pressure stage; and the turbine high pressure stage is a mixed flow turbine stage and the turbine low pressure stage is an axial turbine stage; the shell aft part has a second front portion surrounding the turbine high pressure stage and a second aft portion surrounding the turbine low pressure stage; and the second front portion of the shell aft part conforms to a shape of the mixed flow turbine stage to encase a turbine radial inlet and a turbine axial outlet of the mixed flow turbine stage; and the second aft portion of the shell aft stage diverges aft of the second front portion of the shell aft part.

In addition to one or more of the above disclosed aspects of the ACM or as an alternate, the ACM includes a water collector located: between the turbine stages; and/or at the shell inlet.

In addition to one or more of the above disclosed aspects of the ACM or as an alternate the shell, from end to end, is formed of two unitary half-shell members, coupled to each other by one or more of hinges and fasteners.

In addition to one or more of the above disclosed aspects of the ACM or as an alternate the two unitary half-shell members are formed by additive manufacturing.

Disclosed is another embodiment of the air cycle machine (ACM), including a heat exchanger having a front end and an aft end; a compressor at the front end of the heat exchanger; a turbine at the aft end of the heat exchanger; a shell having a shell front part that surrounds the compressor and defines a shell inlet, a shell aft part that surrounds the turbine and defines a shell outlet, and a shell middle part that surrounds the heat exchanger, wherein a flow passage is defined within the shell and around the compressor, through the heat exchanger, and around the turbine; and a shaft extending between the compressor and the turbine that couples the compressor and the turbine; wherein the turbine includes a turbine high pressure stage and a turbine low pressure stage that is aft of the turbine high pressure stage; and wherein one or more of the turbine low pressure stage and the compressor is a mixed flow rotor.

In addition to one or more of the above disclosed aspects of the another embodiment of the ACM or as an alternate, the ACM includes both of the turbine low pressure stage and the compressor are mixed flow rotors.

In addition to one or more of the above disclosed aspects of the another embodiment of the ACM or as an alternate, the shell is formed by additive manufacturing.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
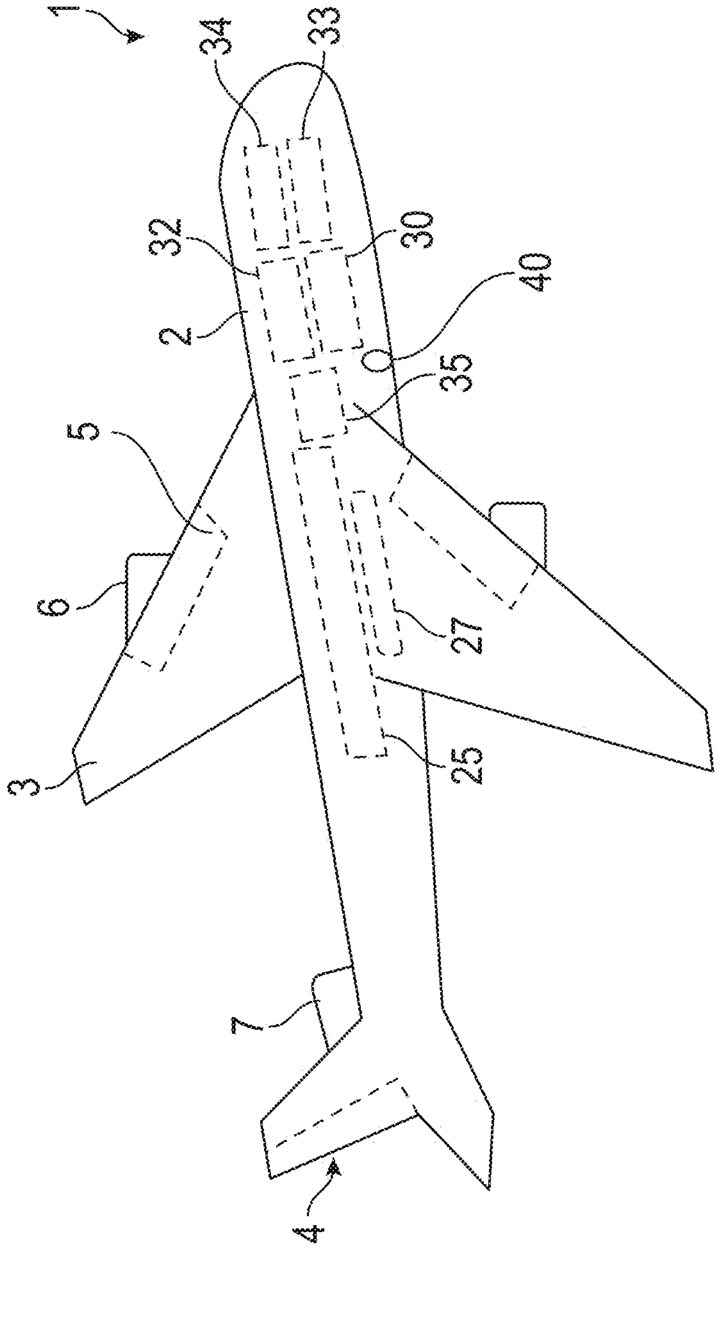
FIG. 1 shows an aircraft that may utilize aspects of the disclosed embodiments.

FIG. 1 shows an aircraft 1 having a fuselage 2 with a wing 3 and tail assembly 4, which may have control surfaces 5. The wing 3 may include an engine 6, such as a gas turbine engine, and an auxiliary power unit 7 may be disposed at the tail assembly 4. The aircraft 1 may have a cabin 25, a cargo bay 27, an environmental control system (ECS) 30 for conditioning the cabin 25 and/or cargo bay 27. The ECS 30 may include a vapor compression system (VCS) 32 that cools air directed to, e.g., the cargo bay 27 and provides refrigeration to one or more systems 35 of the aircraft 1, and an air cycle machine (ACM) 33 that cools air directed to e.g., the cabin 25. A RAM air inlet 40 may scoop air for the ECS 30, or the ECS 30 may receive air recirculated from, e.g., a cabin air compressor 160 (CAC) 34.

Figure 2:
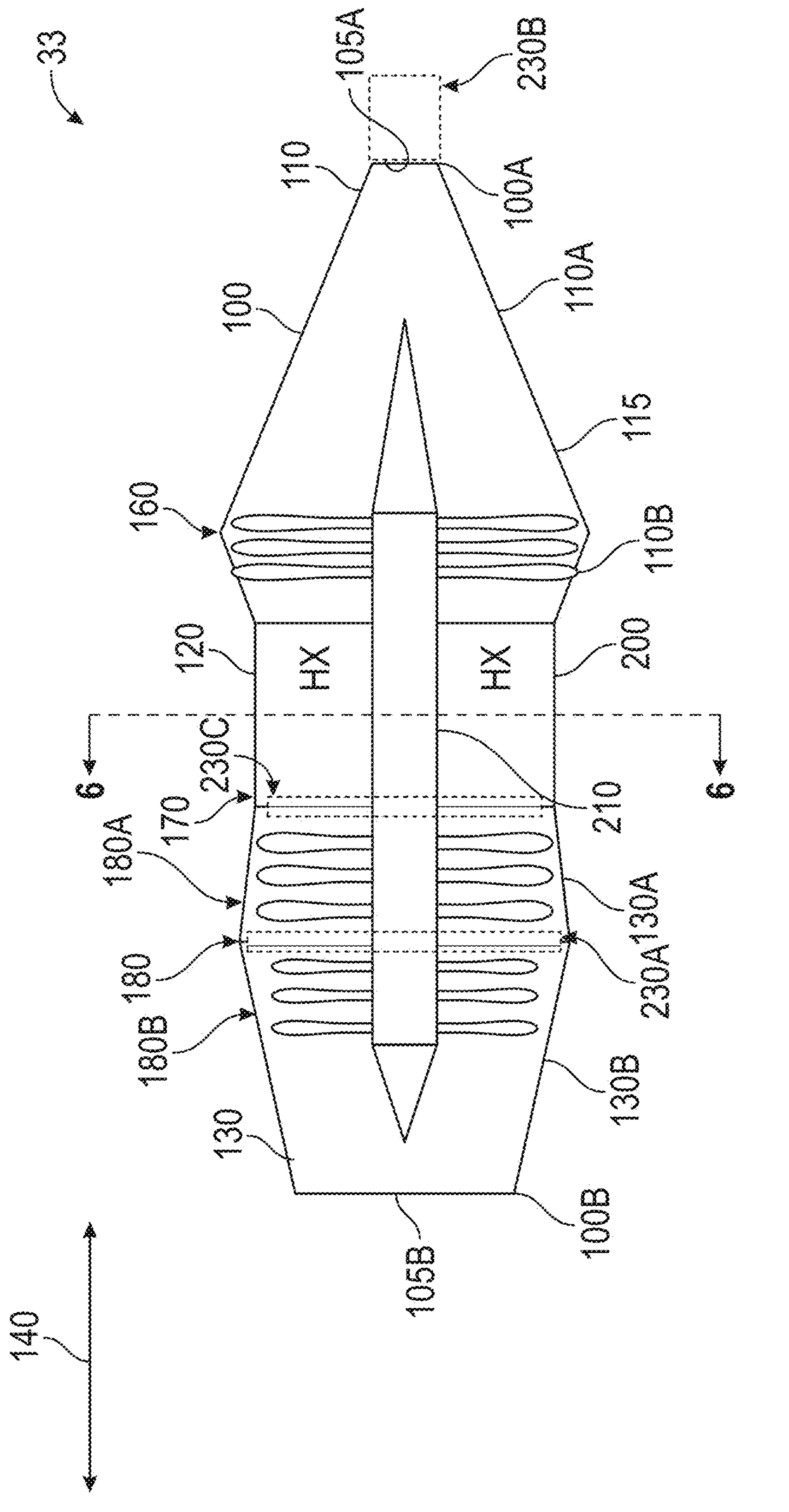
FIG. 2 shows an ACM according to one embodiment, including an axial compressor and turbine within a shell that converges at both ends of the shell.

Turning to FIG. 2, an embodiment of the ACM 33 is shown. The ACM 33 may include a shell 100. The shell 100 has a shell front part 110 defining a shell inlet 105A, a shell middle part 120 and a shell aft part 130 defining a shell outlet 105B. The shell segments (115 for simplicity) may be distributed along an axial direction 140.

A compressor 160 is located in the shell front part 110. A heat exchanger 170 is located in the shell middle part 120. A turbine 180 is located in the shell aft part 130. A flow passage 200 is defined within the shell 100 and around the compressor 160, through the heat exchanger 170, and around the turbine 180. A shaft 210 extends between the compressor 160 and turbine 180 that couples the compressor 160 and the turbine 180.

As shown in FIG. 2, the compressor 160 is an axial compressor 160. The shell front part 110 has a first front portion 110A and a first aft portion 110B surrounding the compressor 160. The first front portion 110A may be forward of the compressor 160. The first front portion 110A of the shell front part 110 diverges toward the first aft portion 110B of the shell front part 110. The aft portion 110B of the shell front part 110 converges toward the shell middle part 120.

The turbine 180 is an axial turbine 180. The turbine 180 includes a turbine high pressure stage 180A and a turbine low pressure stage 180B that is aft of the turbine high pressure stage 180A. The shell aft part 130 has a second front portion 130A surrounding the turbine high pressure stage 180A and a second aft portion 130B surrounding the turbine low pressure stage 180B. The second front portion 130A of the shell aft part 130 diverges toward the second aft portion 130B of the shell aft part 130. The second aft portion 130B of the shell aft part 130 converges aft of the second front portion 130A of the shell aft part 130. With this configuration, the shell 100 converges at both axial ends 100A, 100B.

The ACM 33 may include a water collector (generally 230). The water collector 230A may be located between the turbine stages. In addition, or alternatively, the water collector 230B may extend forward of the shell front part 110. In addition, or alternatively, the water collector 230 may extend forward of at the inlet of the turbine stages 180, i.e., at the outlet of the heat exchanger 200.

Figure 3:
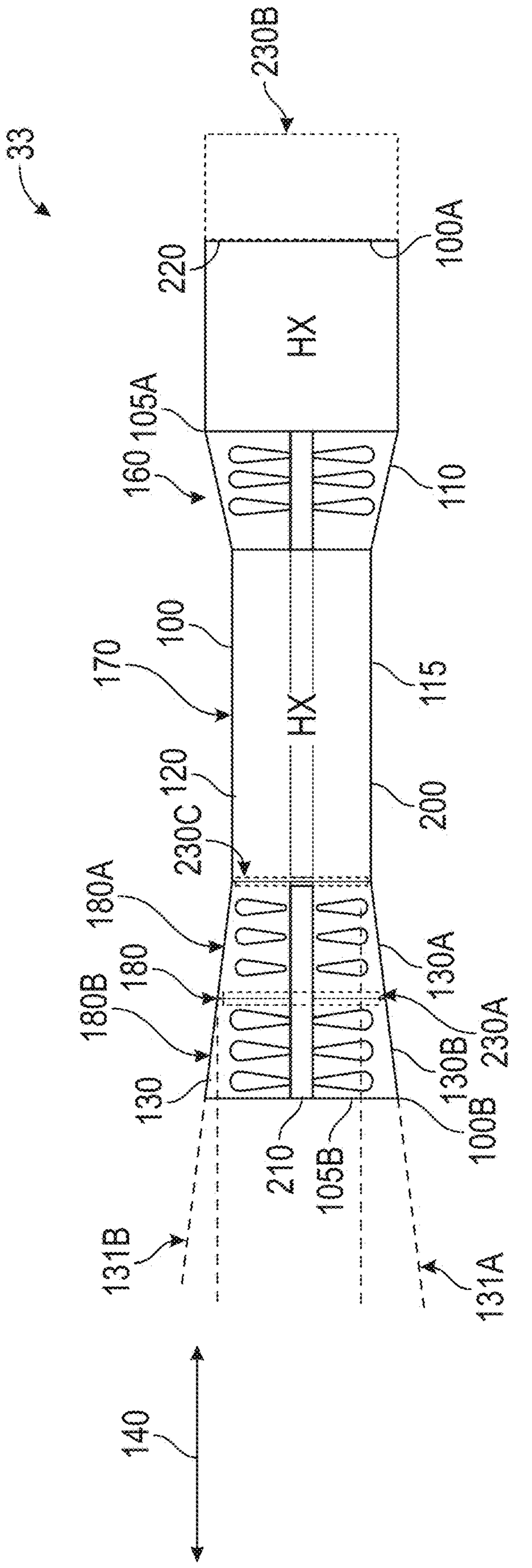
FIG. 3 shows an ACM according to one embodiment, including an axial compressor and turbine within a shell that diverges at both ends of the shell and optionally includes a front end heat exchanger.

Turning to FIG. 3, another embodiment of the ACM 33 is shown. The ACM 33 may include a shell 100. The shell 100 has a shell front part 110 defining a shell inlet 105A, a shell middle part 120 and a shell aft part 130 defining a shell outlet 105B. The shell segments (115 for simplicity) may be distributed along an axial direction 140.

A compressor 160 is located in the shell front part 110. A heat exchanger 170 is located in the shell middle part 120. A turbine 180 is located in the shell aft part 130. A flow passage 200 is defined within the shell 100 and around the compressor 160, through the heat exchanger 170, and around the turbine 180. A shaft 210 extends between the compressor 160 and turbine 180 that couples the compressor 160 and the turbine 180.

As shown in FIG. 3, the compressor 160 is an axial compressor. The shell front part 110 converges toward the shell middle part 120.

The turbine 180 is an axial turbine that includes a turbine high pressure stage 180A and a turbine low pressure stage 180B that is aft of the turbine high pressure stage 180A. The shell aft part 130 has the front portion 130A (corresponding to the second front portion in FIG. 2) surrounding the turbine high pressure stage 180A of the turbine 180. The turbine aft part 130 has the aft portion 130B (corresponding to the second aft portion in FIG. 2) surrounding the turbine low pressure stage 180B of the turbine 180. The front and aft portions 130A, 130B of the shell aft part 130 define first and second diverging cone angles 131A, 131B that diverge aft of the shell middle part 120. The first and second diverging cone angles 131A, 131B may differ from each other to provide optimal flow conditions out of the respective stages of the turbine 180. With this configuration, the shell 100 diverges at both ends 100A, 100B.

In one embodiment, the ACM 33 includes a front heat exchanger 220 extending forward of the shell first part 110. The front heat exchanger 220 may condition air entering the ACM 33 so that, e.g., the compressor 160 operates more efficiently.

The ACM 33 may include a water collector (generally 230). The water collector 230A may be located between the turbine stages. In addition, or alternatively, the water collector 230B may extend forward of the shell front part 110. In addition, or alternatively, the water collector 230 may extend forward of at the inlet of the turbine stages 180, i.e., at the outlet of the heat exchanger 200.

Figure 4:
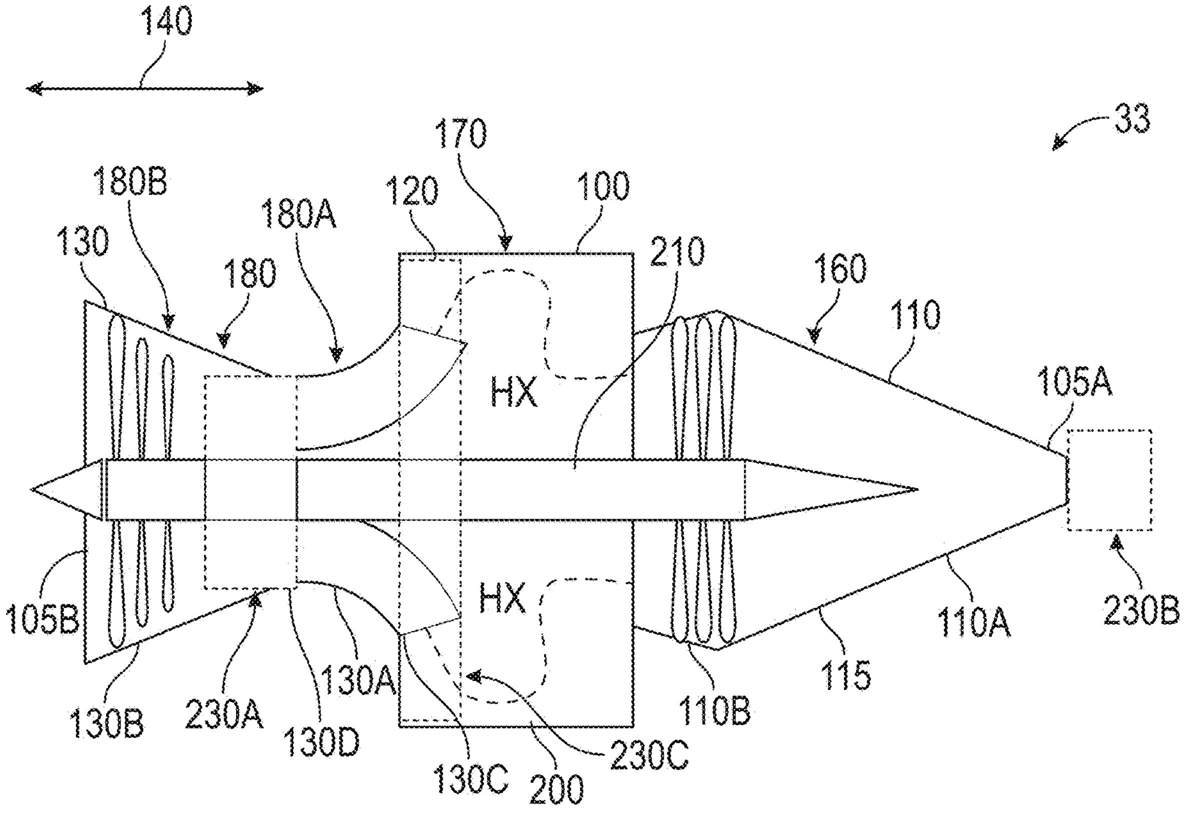
FIG. 4 shows an ACM according to one embodiment, including an axial compressor and turbine having a mixed flow stage, within a shell.

Turning to FIG. 4, another embodiment of the ACM 33 is shown. The ACM 33 may include a shell 100. The shell 100 has a shell front part 110 defining a shell inlet 105A, a shell middle part 120 and a shell aft part 130 defining a shell outlet 105B. The shell segments (115 for simplicity) may be distributed along an axial direction 140.

A compressor 160 is located in the shell front part 110. A heat exchanger 170 is located in the shell middle part 120. A turbine 180 is located in the shell aft part 130. A flow passage 200 is defined within the shell 100 and around the compressor 160, through the heat exchanger 170, and around the turbine 180. A shaft 210 extends between the compressor 160 and turbine 180 that couples the compressor 160 and the turbine 180.

As shown in FIG. 4, the compressor 160 is an axial compressor 160. The shell front part 110 has a first front portion 110A and a first aft portion 110B surrounding the compressor 160. The first front portion 110A may be forward of the compressor 160. The first front portion 110A of the shell front part 110 diverges toward the first aft portion 110B of the shell front part 110. The first aft portion 110B of the shell front part 110 converges toward the shell middle part 120.

The turbine 180 includes a turbine high pressure stage 180A and a turbine low pressure stage 180B that is aft of the turbine high pressure stage 180A. The turbine high pressure stage 180A is a mixed flow turbine stage and the turbine low pressure stage 180B is an axial turbine stage. The shell aft part 130 has a second front portion 130A surrounding the turbine high pressure stage 180A and a second aft portion 130B surrounding the turbine low pressure stage 180B. The second front portion 130A of the shell aft part 130 conforms to a shape of the turbine high pressure stage 180A to encase a turbine radial inlet 130C and a turbine axial outlet 130D of the turbine high pressure stage 180A. The second aft portion 130B of the shell aft part 130 diverges aft of the second front portion 130B of the shell aft part 130.

The ACM 33 may include a water collector (generally 230). The water collector 230A may be located between the turbine stages. In addition, or alternatively, the water collector 230B may extend forward of the shell front part 110. In addition, or alternatively, the water collector 230 may extend forward of at the inlet of the turbine stages 180, i.e., at the outlet of the heat exchanger 200.

Figure 5:
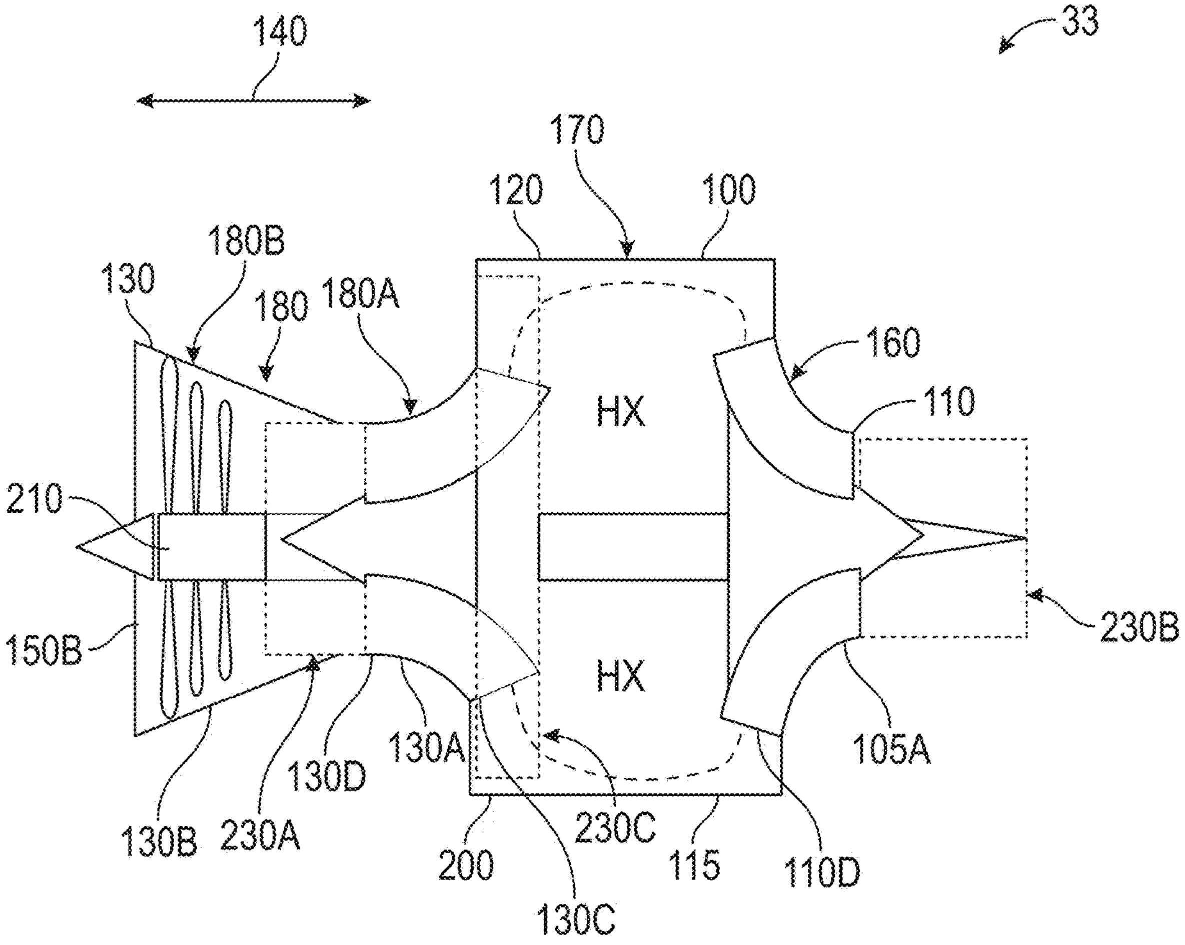
FIG. 5 shows an ACM according to one embodiment, including a centrifugal compressor and turbine having a mixed flow stage, within a shell.

Turning to FIG. 5, another embodiment of the ACM 33 is shown. The ACM 33 may include a shell 100. The shell 100 has a shell front part 110 defining a shell inlet 105A, a shell middle part 120, and a shell aft part 130 defining a shell outlet 105B. The shell segments (115 for simplicity) may be distributed along an axial direction 140.

A compressor 160 is located in the shell front part 110. A heat exchanger 170 is located in the shell middle part 120. A turbine 180 is located in the shell aft part 130. A flow passage 200 is defined within the shell 100 and around the compressor 160, through the heat exchanger 170, and around the turbine 180. A shaft 210 extends between the compressor 160 and turbine 180 that operationally couples the compressor 160 and the turbine 180.

As shown in FIG. 5, the compressor 160 is a centrifugal compressor. The shell front part 110 conforms to a shape of the centrifugal compressor 160 so that the shell inlet 105A is a compressor axial inlet and the shell 100 encases a compressor radial outlet 110D.

The turbine 180 includes a turbine high pressure stage 180A and a turbine low pressure stage 180B that is aft of the turbine high pressure stage 180A. The turbine high pressure stage 180A is a mixed flow turbine stage and the turbine low pressure stage 180B is an axial turbine stage. The shell aft part 130 has a front portion 130A (corresponding to the second front portion of FIG. 2) surrounding the turbine high pressure stage 180A and an aft portion 130B (corresponding to the second aft portion of FIG. 2) surrounding the turbine low pressure stage 180B. The front portion 130A of the shell aft part 130 conforms to a shape of the turbine high pressure stage 180A to encase a turbine radial inlet 130C and a turbine axial outlet 130D of the turbine high pressure stage 180A. The aft portion 130B of the shell aft part 130 diverges aft of front portion 130A of the shell aft part 130.

The ACM 33 may include a water collector (generally 230). The water collector 230A may be located between the turbine stages. In addition, or alternatively, the water collector 230B may extend forward of the shell front part 110. In addition, or alternatively, the water collector 230 may extend forward of at the inlet of the turbine stages 180, i.e., at the outlet of the heat exchanger 200.

Figure 6:
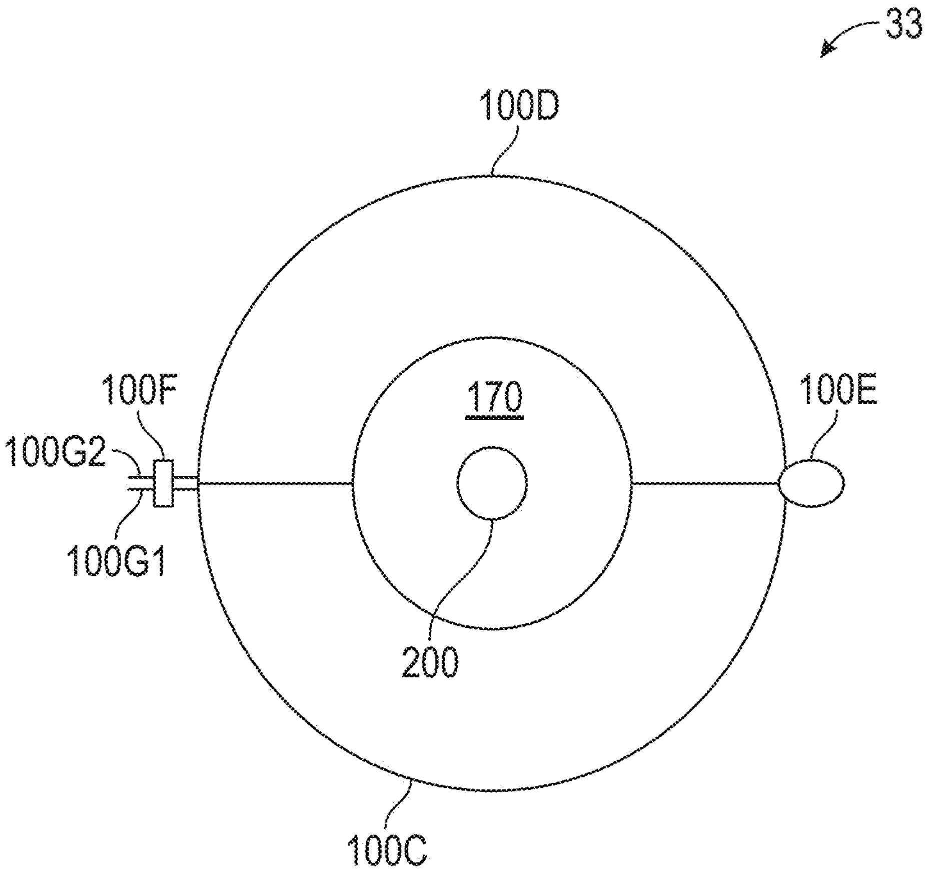
FIG. 6 is a cross section of the ACM along lines 6-6 in FIG. 2 and shows segments of a shell surrounding the ACM according to an embodiment.

As shown in FIG. 6, the shell 100, from end to end, may be formed of two unitary half-shell members 100C, 100D. The half-shell members 100C, 100D may be additively manufactured and coupled to each other by one or more of hinges 100E and fasteners 100F, e.g., securing flanges 100G1, 100G2 formed on mate-faces of the half-shell members 100C, 100D. Components of the ACM 33, such as the heat exchanger 170 and the shaft 210 shown in FIG. 6, may be installed and within the shell halves, which may then be closed around the components. The shell halves 100C, 100D may be later opened to service the components.

Accordingly, the embodiments provide a unitary ACM, rather than utilizing separate components for it, and utilizes at least one axial stage rotor rather than only mixed flow rotors. This configuration reduces inefficiencies that may be otherwise introduced by the ACM in an ECS. The disclosed configuration also provides containment around the compressor and turbine stages. A further benefit is reduced drag that is otherwise added to the aircraft by utilization of the ACM.

The terminology used herein is for the purpose of describing particular embodiments only and is not intended to be limiting of the present disclosure. The term "about" is intended to include the degree of error associated with measurement of the particular quantity and/or manufacturing tolerances based upon the equipment available at the time of filing the application. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

What is claimed is:

1. An air cycle machine (ACM), comprising a heat exchanger having a front end and an aft end;

a compressor at the front end of the heat exchanger;

a turbine at the aft end of the heat exchanger;

a shell having a shell front part that surrounds the compressor and defines a shell inlet, a shell aft part that surrounds the turbine and defines a shell outlet, and a shell middle part that surrounds the heat exchanger, wherein a flow passage is defined within the shell and around the compressor, through the heat exchanger, and around the turbine; and a shaft extending between the compressor and the turbine that couples the compressor and the turbine, wherein:

the compressor is an axial compressor;

the shell front part has a first front portion that is forward of the compressor and a first aft portion surrounding the compressor;

the first front portion of the shell front part diverges toward the first aft portion of the shell front part; and the first aft portion of the shell front part converges toward the shell middle part.

2. The ACM of claim 1, wherein:

the turbine is an axial turbine that comprises a turbine high pressure stage and a turbine low pressure stage that is aft of the turbine high pressure stage;

the shell aft part has a second front portion surrounding the turbine high pressure stage and a second aft portion surrounding the turbine low pressure stage;

the second front and aft portions of the shell aft part define first and second diverging cone angles that diverge aft of the shell middle part.

3. The ACM of claim 2, wherein the first and second diverging cone angles differ from each other.

4. The ACM of claim 2, including a front heat exchanger extending forward from the shell front part.

5. The ACM of claim 1, wherein:

the turbine comprises a turbine high pressure stage and a turbine low pressure stage that is aft of the turbine high pressure stage;

the turbine high pressure stage is a mixed flow turbine stage and the turbine low pressure stage is an axial turbine stage;

the shell aft part has a second front portion surrounding the turbine high pressure stage and a second aft portion surrounding the turbine low pressure stage;

the second front portion of the shell aft part conforms to a shape of the mixed flow turbine stage to encase a turbine radial inlet and a turbine axial outlet of the mixed flow turbine stage; and the second aft portion of the shell aft part diverges aft of the second front portion the shell aft part.

6. The ACM of claim 5, including a water collector located:

between the turbine stages; and/or at the shell inlet.

7. The ACM of claim 1, wherein the shell, from end to end, is formed of two unitary half-shell members, coupled to each other by one or more of hinges and fasteners.

8. The ACM of claim 7, wherein the two unitary half-shell members are formed by additive manufacturing.

9. An air cycle machine (ACM), comprising a heat exchanger having a front end and an aft end;

a compressor at the front end of the heat exchanger;

a turbine at the aft end of the heat exchanger;

a shell having a shell front part that surrounds the compressor and defines a shell inlet, a shell aft part that surrounds the turbine and defines a shell outlet, and a shell middle part that surrounds the heat exchanger, wherein a flow passage is defined within the shell and around the compressor, through the heat exchanger, and around the turbine; and a shaft extending between the compressor and the turbine that couples the compressor and the turbine, wherein:

the turbine is an axial turbine that comprises a turbine high pressure stage and a turbine low pressure stage that is aft of the turbine high pressure stage;

the shell aft part has a second front portion surrounding the turbine high pressure stage and a second aft portion surrounding the turbine low pressure stage;

the second front portion of the shell aft part diverges toward the second aft portion of the shell aft part; and the second aft portion of the shell aft part converges aft of the second front portion of the shell aft part.

10. The ACM of claim 9, wherein the shell, from end to end, is formed of two unitary half-shell members, coupled to each other by one or more of hinges and fasteners.

11. The ACM of claim 10, wherein the two unitary half-shell members are formed by additive manufacturing.

12. An air cycle machine (ACM), comprising a heat exchanger having a front end and an aft end;

a compressor at the front end of the heat exchanger;

a turbine at the aft end of the heat exchanger;

a shell having a shell front part that surrounds the compressor and defines a shell inlet, a shell aft part that surrounds the turbine and defines a shell outlet, and a shell middle part that surrounds the heat exchanger, wherein a flow passage is defined within the shell and around the compressor, through the heat exchanger, and around the turbine; and a shaft extending between the compressor and the turbine that couples the compressor and the turbine, wherein:

the compressor is an axial compressor; and the shell front part converges toward the shell middle part.

13. The ACM of claim 12, wherein the shell, from end to end, is formed of two unitary half-shell members, coupled to each other by one or more of hinges and fasteners.

14. The ACM of claim 13, wherein the two unitary half-shell members are formed by additive manufacturing.

* * * * *